Sept. 15, 1936.  P. N. LVOV  2,054,384
TRANSPORTABLE ELECTRIC WELDING DEVICE
Filed Feb. 25, 1935  2 Sheets-Sheet 1

P. N. Lvov
INVENTOR

By: Glascock Downing Seebold
Attys.

Sept. 15, 1936.   P. N. LVOV   2,054,384
TRANSPORTABLE ELECTRIC WELDING DEVICE
Filed Feb. 25, 1935   2 Sheets-Sheet 2

P. N. Lvov
Inventor

By Glascock Downing Seebolt
Attys.

Patented Sept. 15, 1936

2,054,384

UNITED STATES PATENT OFFICE 2,054,384

TRANSPORTABLE ELECTRIC WELDING DEVICE

Peter Nicolaievitch Lvov, Moscow, Union of Soviet Socialist Republics

Application February 25, 1935, Serial No. 8,169. In Union of Soviet Socialist Republics June 7, 1934

7 Claims. (Cl. 219—4)

In usual electric welding machines, working by the resistance method (incandescent process), the pressure exerted by the movable electrode on the surface to be welded has the greatest importance.

In many cases of repair work, in structural work, in railway practice, in mounting work or the like it is often impossible to provide compressed air or water under pressure to the place of welding, so that the pressure on the electrode can be exerted only by hand thus depending upon the skill of the operator and not ensuring the uniformity of the welded joint.

The present invention provides on the contrary an automatic regulation of the pressure of the electrode in the welding process, said pressure being independent of the force exerted by the operator and a quite uniform welded seam is obtained.

In the accompanying drawings is shown, by way of example, one form of embodiment of this invention.

Figure 1:
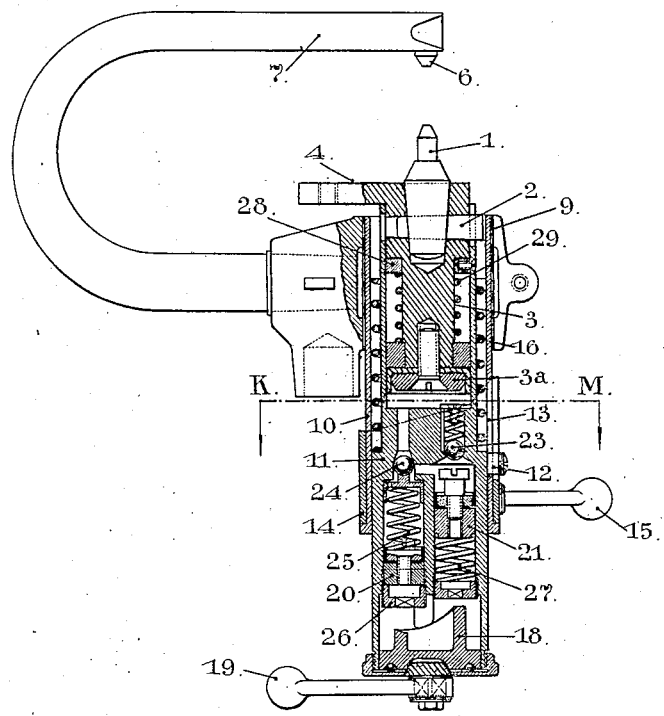
Figure 2:
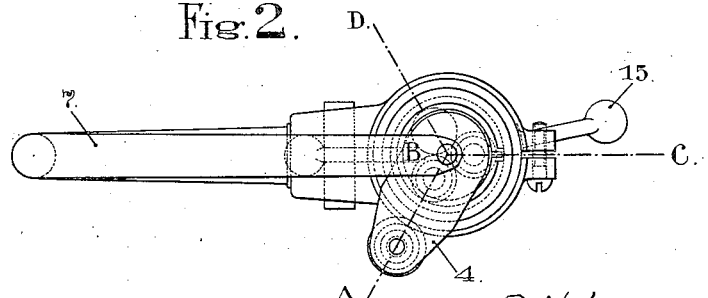
Figure 3:
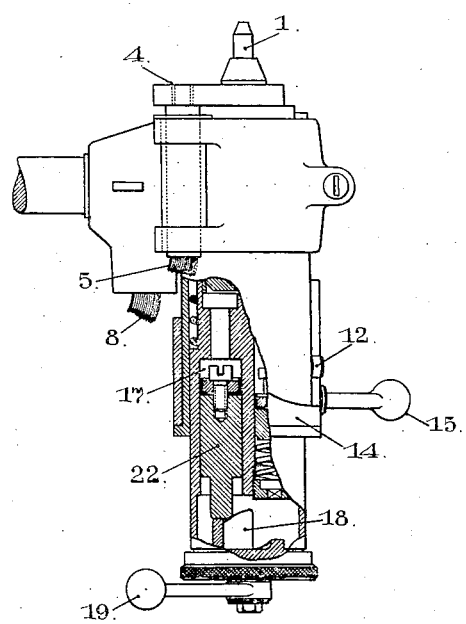
Figure 4:
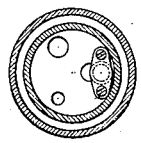

Fig. 1 is a longitudinal section along the line ABC of Fig. 2; Fig. 2 is a plan view; Fig. 3 is a front view partially in section along the line DBC of Fig. 2; Fig. 4—a transverse section along the line KM of Fig. 1.

The electrode 1, which presses on the welding surface, is secured in the core 3 by means of a key 2 and is connected to the electric supply circuit by means of the electric cable 5. The second electrode 6 is placed, facing the first, in the yoke 7 which at its ring-shaped broad end is attached to the cylindrical casing 10, being insulated from this casing by a mica sleeve 9.

The second electrode 6 is likewise connected to the electric source by means of a second electric cable 8.

Within the casing 10 glides the inserted piece 11 and within this latter is slidably inserted the piston 3a which constitutes the lowermost end of the core 3. The pin 12 of the member 11 moves in a vertical direction in the vertical slot 13 of the casing so that the member 11 can move only axially within the casing.

Upon the casing 10 is arranged a cam 14 having a helical end surface and provided with a handle 15.

By turning the cam 14 the member 11 is moved by means of the pin 12, in axial direction within the casing together with the electrode 1.

Under the action of the spring 16 the member 11 tends to return in its initial position.

Thus the electrode 1 is moved towards the point of welding by turning the cam 14 by means of the handle 15.

The member 11 has in its lower portion three recesses (channels).

In the recess 17 glides the piston 22 (Fig. 3) which is lifted by the pressure of the cam 18 rotatably mounted at the bottom of the insert 11. The turning of the cam 18 is effected by means of the handle 19.

In the other two recesses are situated two pistons 20 and 21. The space under the piston 3a and over the pistons 20, 21, 22 is filled with some liquid, preferably with oil or glycerine.

By turning the cam 18 the piston 22 is forced to enter into the recess 17 within the member 11, which recess is filled with oil.

In this case the compressed oil exerts upon the piston 3a a pressure equal to the pressure of the cam 18 upon the piston 22 multiplied by the ratio of squares of diameters of the pistons 3a and 22, that is in this form of embodiment of the invention said pressure will be 4 times as great as the pressure of the cam. This pressure is transmitted by the piston 3a to the electrode 1.

If the pressure is too great the spring 25 will be compressed by the action of the oil pressing on the ball valve 24 and the excess of oil will be squeezed out into the chamber of the piston 21, and this latter will compress the spring 27.

Thus is avoided excessive pressure on the point of welding exerted by the operator. The pressure on the electrode depends upon the compression of the spring 25. Said compression can be adjusted by turning the screw 26.

If the cam 18 is turned back and the pressure on the electrode 1 correspondingly diminishes, the valve 24 will be closed by the spring 25, and the spring 27 pressing upon the piston 21 expels the liquid through the valve 23 into the space under the piston 3a and over the piston 22. The piston 22 moves down and the pressure on the piston 3a and on the electrode 1 decreases.

The piston 3a has a small play in the member 11 and under action of a spring 29 bears against the supporting ring 28.

As the pressure of the liquid drops the spring 29 returns the piston 3a onto the supporting ring 28.

The operation of the device is as follows:

After the point of welding has been placed between the electrodes 1 and 6 in contact with 6, the handle 15 is turned until the electrode 1 comes into contact with the point of welding. Thereupon by turning the handle 19 the electrode 1 is pressed against the point of welding and at the same time the required impulse of the current is sent.

The turning of the handles 15 and 19 may be effected by means of a foot treadle or through the intermediation of a lever transmission, instead of by hand.

The above-described device has the following advantages in comparison with usual forms of appliances of the same kind:

1. The electrodes move in straight line whereby is ensured a correct bearing of contacts against each other and consequently the uniformity of the welding seam.

2. The device is not dependent on any pneumatic or hydraulic installation.

3. The pressure on the electrode is constant and does not depend on the force applied by the operator.

4. An enlarged scale of application.

What I claim, is:

1. In an electric welding device, a frame, a stationary electrode mounted therein, a cylinder fixedly mounted in said frame, facing said stationary electrode, an insert slidably mounted in said cylinder and having a transverse partition in its central point, means for moving said insert toward the stationary electrode and returning it, and having a large concentric bore on the side of the partition toward said electrode and three smaller bores on the other side, a piston fitting slidably in the large bore, forming a space between the piston and the partition for the confinement of an incompressible liquid, a movable electrode mounted on said piston to register with the stationary electrode, separate channels connecting said space with each of said smaller bores, a piston in each of said smaller bores, means connected with one of said pistons to impose pressure on the incompressible fluid, and means including the other two pistons for releasing the fluid when the pressure reaches a predetermined maximum and returning the fluid to said space when the pressure on said fluid is released.

2. A device as claimed in claim 1, in which the means for moving the insert toward the electrode comprises a helical cam rotatably mounted on the cylinder, and a bolt attached to the insert and extending through a longitudinal slot in the cylinder and contacting said cam.

3. A device as claimed in claim 1, in which the larger piston is of reduced diameter between its ends and a supporting ring surrounding said reduced diameter is secured to the insert to buffer said piston.

4. In an electric welding device a frame, a stationary electrode mounted therein, a cylinder fixedly mounted in said frame facing said stationary electrode, an insert slidably mounted in said cylinder and having a partition in its central portion, a large bore above the partition and three smaller bores below the partition, each communicating with the upper bore through the partition, means for moving said insert toward and away from the stationary electrode and means for returning said insert, a piston slidably mounted in the large bore forming a space between the piston and the partition for the confinement of an incompressible liquid, a smaller piston slidably mounted in one of the smaller bores and means for moving said smaller piston whereby pressure is exerted on the fluid confined in the space between the larger piston and the partition, a movable electrode mounted on said piston facing the stationary electrode, a spring pressed outlet valve mounted to close the communication between another of the smaller bores and said space, a spring pressed piston mounted in the third smaller bore, a spring pressed inlet valve closing the communication between the last named bore and said space whereby the pressure in said space is limited to a predetermined amount and the parts are returned to their normal condition on release of the pressure.

5. Portable electric welding device having a movable and a stationary electrode, a casing having a longitudinal slot secured to the stationary electrode and an axially displaceable insert in said casing carrying the movable electrode, a rotatable worm guide and a bolt extending into the slot of the casing for the axial displacement of the insert, a second worm guide in the insert, with an operating arm, a small piston axially displaceable in the insert by means of the said guide, a larger piston connected to the movable electrode, there being a space for incompressible fluid between said pistons, the pressure of the fluid enclosed between the pistons being transferred to the larger piston according to the principle of the hydraulic press and inceased according to the second power of the piston diameter.

6. Portable electric welding device having a movable and a stationary electrode, a casing secured to the stationary electrode and having an axially displaceable insert carrying the movable electrode, a core displaceable in the said insert and carrying the movable electrode, the lower part of the core being formed as a larger piston and three axially adjacent bores in one of which a smaller pressure piston is arranged, there being a space for incompressible fluid between said pistons a maximum pressure ball valve arranged in the second bore and adapted to limit the pressure on the large piston carrying the movable electrode, a channel communicating between the second and third bore and a buffered piston arranged in the third bore and yielding when fluid is forced from the space between the small and the large piston, a ball non-return valve arranged above said last named piston, a channel closed by said valve and leading to said space whereby upon release of the welding device by the pressure of its spring the pressure fluid is forced back into said space.

7. Portable electric welding device having a movable and a stationary electrode, a casing secured to the stationary electrode and having an axially displaceable insert, an axially movable core in the said insert, the lower part of the core forming a piston and the upper part carrying the movable electrode, means for moving said piston upwardly in said insert and a supporting ring secured in the insert, the core with the electrode and the piston being buffered against the supporting ring and having a small clearance.

PETER NICOLAIEVITCH LVOV.